June 18, 1963 L. CHAMPOUX ETAL 3,094,017
LOCK BOLT SEALING COLLAR AND METHOD OF INSTALLING THE SAME
Filed May 11, 1959 2 Sheets-Sheet 1

INVENTORS.
LOUIS CHAMPOUX
GEORGE SIEBOL
BY
Reynolds, Beach & Christensen
ATTORNEYS

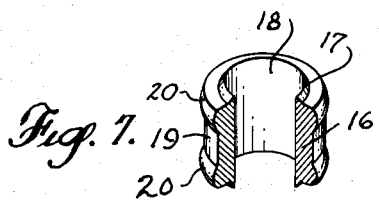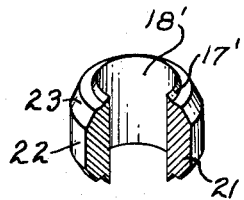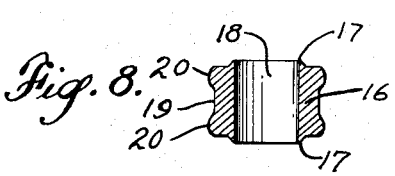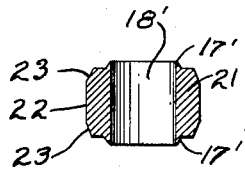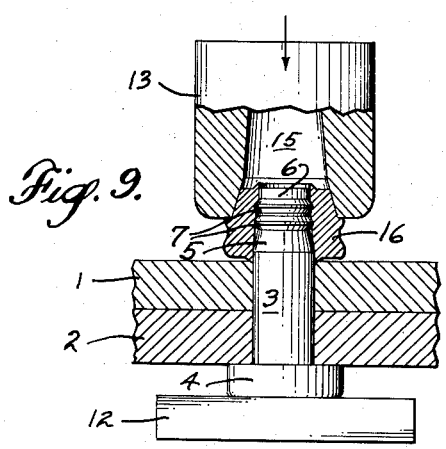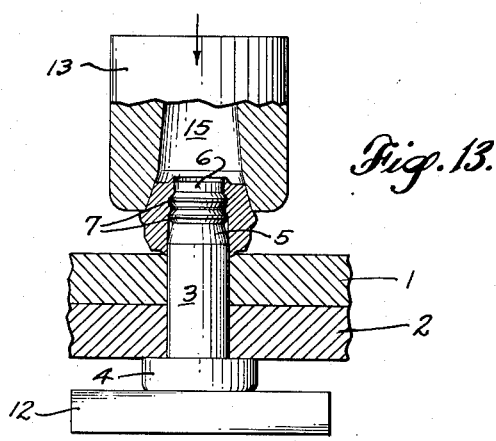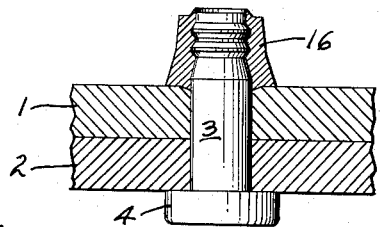

United States Patent Office 3,094,017
Patented June 18, 1963

3,094,017
LOCK BOLT SEALING COLLAR AND METHOD OF INSTALLING THE SAME
Louis Champoux, Seattle, Wash., and George Siebol, Downey, Calif., assignors to Boeing Airplane Company, Seattle, Wash., a corporation of Delaware
Filed May 11, 1959, Ser. No. 812,463
3 Claims. (Cl. 78—46)

This invention relates to lock bolts and in particular to collars for such lock bolts which will effect a seal of the aperture through which the lock bolt extends.

Lock bolts customarily are employed in making joints in pressure vessels, such, for example, as aircraft fuel tanks and pressurized airplane cabins. Where lock bolts have been used in making joints in a fuel tank, it has been the practice heretofore to provide a sealing member or compound completely enclosing the lock collar. For use in airplanes such sealing members have added weight undesirably and involve the expense of application after the lock bolt has been installed.

It is the principal object of the present invention to provide a collar for a lock bolt and a method of installing it which will automatically effect a leakproof seal of the aperture through which the lock bolt extends by the operation of applying the collar in locking relationship to the bolt and without any subsequent operation being required.

It is also an object to provide a sealing construction for the aperture through which the lock bolt extends, which will maintain the seal over an extended period of time despite the application of stress to and working of the joint.

Such sealing object can be accomplished by use of a lock bolt collar having a sealing rib at one end of the collar bore which projects beyond the adjacent principal end face of the collar. In installing the collar on the lock bolt the collar is swaged so as to constrict it radially into contiguous engagement with the lock bolt when the rib is in engagement with the apertured member through which the lock bolt extends. During such swaging, material of the collar is moved axially sufficiently to dispose the end of the collar adjacent to the apertured member in abutment with the apertured member, and to produce a concentrated compressive stress in the material of the rib in an annulation at the junction of the apertured member and bolt, which compressive stress will be sustained by the deformed collar after completion of the setting operation.

Figure 1:
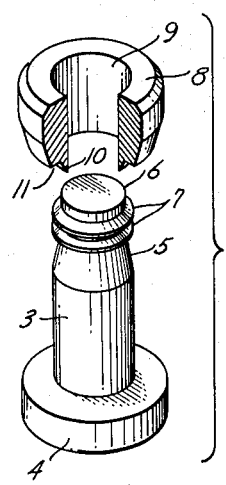
FIGURE 1 is a top perspective view of a lock bolt and the sealing collar in exploded relationship, part of the collar being broken away.

FIGURE 7 is a top perspective view of an alternative form of lock bolt collar with the front quadrant broken away, FIGURE 8 is a diametral sectional view through such collar, and FIGURE 9 is a similar view of the collar shown engaged with a lock bolt in side elevation during the performance of the setting operation. FIGURE 10 is a sectional view through a completed lock bolt and collar installation.

FIGURE 11 is a top perspective view of a lock bolt collar of different form, and FIGURE 12 is a diametral section through such collar. FIGURE 13 is a diametral sectional view through the collar assembled with a lock bolt shown in elevation and illustrated during the setting operation.

A typical use for lock bolts is to secure together plates 1 and 2 of metal, which may be overlapping parts of a plate joint used, for example, in the construction of a fuel tank for an airplane. Especially for such a use, it is important that the joint be leakproof. If a lock bolt, a threaded bolt or a rivet is employed to connect plates such as 1 and 2, and such a connecting member is tensioned sufficiently, it is not very difficult to press together the surfaces of the plates 1 and 2, which are in face-to-face contact, sufficiently tightly to prevent leakage between such surfaces if they are reasonably smooth and close fitting. The problem of preventing leakage through such a joint has been to provide an effective seal between the shank of the joining member and the apertured members through which the joining member extends.

In the drawings only a single lock bolt installation is shown, but it will be understood that such lock bolts can be arranged in a row according to conventional practice. The plates 1 and 2 have registering apertures through which the shank of a lock bolt extends. The lock bolt shank portion 3 fits snugly in such plate apertures, preferably being from a light to a heavy press fit. Movement of the lock bolt shank through the plate apertures will be limited by the lock bolt head 4, which is shown as a cylindrical head although it could be of any desired shape. The portion 3 of the lock bolt shank fitting in the apertures in the plates 1 and 2 is cylindrical to fit uniformly in such apertures. It is preferred that the length of such uniform cylindrical portion of the shank be just slightly greater than the total length of the apertures through the plates 1 and 2, so that the remainder of the lock bolt projects beyond the surface of the plate 1 opposite the lock bolt head 4.

The portion of the lock bolt projecting beyond the surface of the plate 1 is formed for complemental locking engagement with a lock collar or ring. A preferred conformation of the projecting portion of the lock bolt includes a conical surface 5 tapering away from the cylindrical shank portion 3 to a cylindrical portion 6 of smaller diameter than the shank portion 3. At least one, and preferably two or more, annular ribs 7 project radially from the cylindrical portion 6 to a diameter approximately equal to the diameter of the shank portion 3. These ribs are formed integral with the lock bolt body so that a force directed lengthwise of the lock bolt can be exerted on them to place the lock bolt in tension.

The lock collar for locking the bolt against axial movement is a ring 8 having a bore 9 which is of a size to fit closely about the peripheries of the annular ribs 7 of the lock bolt and the shank portion 3. At one end of such bore is the annular sealing rib 10 projecting axially beyond the principal face 11 of the adjacent lock collar end. The internal periphery of the rib 10 is of cylindrical shape formed as a portion of the bore 9 of the ring. The outer surface of the rib 10 is a conic surface converging from the principal ring end face 11 away from such face to a circular intersection with the inner cylindrical surface of the rib. The radial width of the base of such rib is a minor portion of the ring's maximum radial thickness. Encircling the rib is an annular end surface or shoulder of the ring end forming a reentrant angle with the outer periphery of the rib.

The angle between an element of the conic surface 11 and the axis of the ring 8 may be of different degrees depending upon the relationship desired between the radial root dimension of the rib and the axial dimension of such rib beyond the principal end surface 11 of the ring. Such angle may vary from 20° to 80°, a larger angle being used for larger collar sizes. For a lock collar having an aperture ¾₁₆ of an inch in diameter, it is preferred that such angle be between 30° and 40°, an angle of 35° being satisfactory. For lock collars having apertures more than ¼ of an inch in diameter, the angle should be 60° or more. Also, the radial width of the rib at its root and the axial projection of the rib for any given angle can be varied in design, and normally will differ depending upon the diameter of the lock bolt and the collar. For a lock bolt having a diameter of ¾₁₆ of an inch the axial projection of the rib 10 beyond the principal end surface 11 of the lock collar can be from ¹⁄₆₄ of an inch to ¹⁄₃₂ of an inch, about .020 of an inch being preferred. In a particular example found to be satisfactory, the diameter of the lock collar bore 9 was 0.190 of an inch, the axial projection of the rib 10 beyond the face 11 was 0.0185 of an inch, and the angle between the outer conic surface of the ring and the axis of the ring was 35°. For each increase of ¹⁄₁₆ of an inch in diameter the projection of the rib should be increased .005 of an inch.

The entire ring 8 forming the lock collar is made of malleable metal, and the axially projecting rib 10 is formed integral with the ring and is made of similar malleable metal. A metal which has been found to be satisfactory for such a ring and rib is a reasonably hard aluminum alloy, preferably of heat-treated type. The dimensions of the rib 10 and its shape will be governed to some extent by the type of material of which the lock collar is made, as well as by the dimensions of the lock collar proper. Also, the size of the rib selected will depend upon the force to be exerted on the lock collar in setting it in locking engagement with the lock bolt because it is desired to effect axial movement of material of the ring 8 during the setting operation sufficient to bring the principal end surface 11 of the ring into abutment with the apertured plate 1 through which the lock bolt extends.

In order to set the lock collar ring 8 in locking engagement with the portion of the lock bolt projecting beyond the surface of the apertured plate 1, it is necessary to apply a swaging force to the ring which will constrict it so as to deform the cylindrical bore 9 into a shape complemental to the exterior shape of the lock bolt projection, including the annular ribs 7. At the same time that such ring constriction is effected, material of the ring should be moved axially to dispose the principal end surface 11 in abutment with the apertured member 1 through which the lock bolt extends. In addition, the rib 10 should be forced toward the junction of the apertured member and the lock bolt shank so as to be placed under substantial compressive stress for effecting tight contact with the lock bolt shank and the portion of the apertured member immediately encircling it to effect a leakproof seal of the aperture through which the lock bolt extends.

Figure 2:
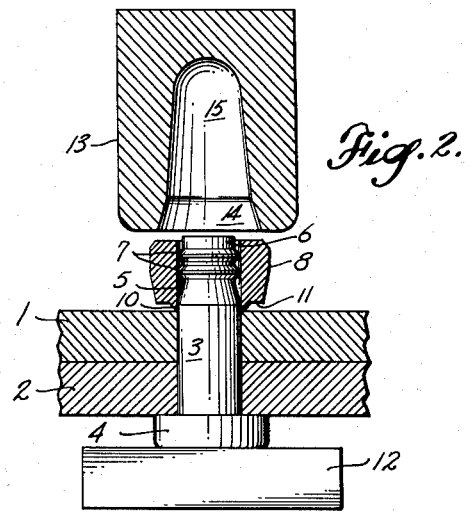
FIGURE 2 is a longitudinal sectional view through the collar set and the collar placed about the lock bolt shown in side elevation in position extending through apertured plate members shown in section, preparatory to the collar setting operation.

FIGURES 2 to 5, inclusive, of the drawings illustrate progressive steps in the collar setting operation effecting such deformation of the collar. In FIGURE 2 the ring 8 has been placed over the portion of the lock bolt shank projecting beyond the upper surface of the apertured plate 1. The lock bolt is held in position with its head 4 in engagement with the lower surface of the apertured plate 2 by an anvil or backing member 12. The ring has been placed in a position encircling the portion of the lock bolt projecting beyond the side of the apertured structure opposite head 4 with the rib 10 in contact with the apertured member through which the lock bolt projects.

Figure 3:
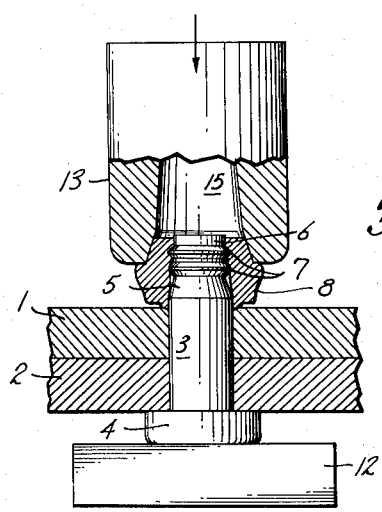
FIGURES 3 and 4 are similar views showing the components in positions assumed during subsequent stages of the setting operation.

In FIGURE 3 the swaging operation of the ring 8 is in progress, and the ring has been partially constricted into intimate contact with the ribs 7 of the lock bolt. Material of the collar also is in the process of being moved axially of the ring toward the apertured member so as to move the principal end surface 11 of the ring toward the apertured member and initiate compression of the rib 10 accompanied by its axial deformation. The deformation of the ring 8 has progressed farther in FIGURE 4 to the stage where the bore 9 has been constricted substantially into contiguous engagement with the portion of the lock bolt projecting beyond the apertured member.

Figure 5:
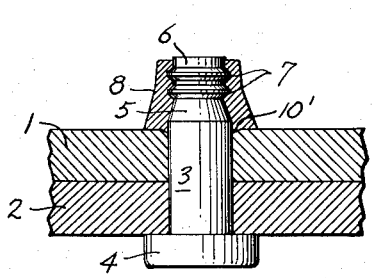
FIGURE 5 is a view showing the lock bolt in side elevation, the collar set on it in longitudinal section and apertured plates joined by the lock bolt shown in section.

In FIGURE 5 setting of the collar has been completed. The ring 8 has been swaged into holding contact with the ribs 7 of the lock bolt and the material of the ring between such ribs and the apertured member has been forced radially inward to produce an extending force tending to pull the ribs 7 away from the apertured member and produce a tension stress in the lock bolt. At the same time material of the ring moved axially toward the apertured member has eventually moved the principal end surface 11 into abutment with the apertured member and placed both the collar and such apertured member encircling the lock bolt shank under compressive stress so as to maintain the surfaces between plates 1 and 2 in close abutment.

Figure 6:
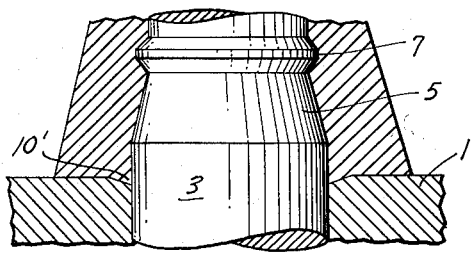
FIGURE 6 is a view similar to FIGURE 5 on an enlarged scale with parts broken away.

As material of the ring is moved both axially toward the apertured member and is constricted, the material of the rib 10 is deformed, and because it projects beyond the general surface 11 of the ring end such rib material is compressively stressed to a much greater degree than the material of the collar outwardly from it, so that the compressive stress in the surface portion of the plate 1 directly under such rib is greater than in the remainder of the surface portion of the plate beneath the lock collar. Moreover, such rib material against the lock bolt shank and the surface of the apertured member at the surface junction of the lock bolt and the apertured member will produce a compressive stress annulation in the surface portion of the apertured member immediately adjacent to the aperture and slight depression of such apertured member, as shown best in FIGURE 6, as well as stressing the rib material of the collar. Such compressive stress annulation in the material of the lock collar rib and the apertured member at the surface junction of the apertured member and the lock bolt shank is of a width radially of the lock collar less than the maximum radial thickness of the lock collar, is located nearer the inner periphery than the outer periphery of the lock collar and will produce an effective seal between the members forming the joint to render such joint leakproof.

Figure 4:
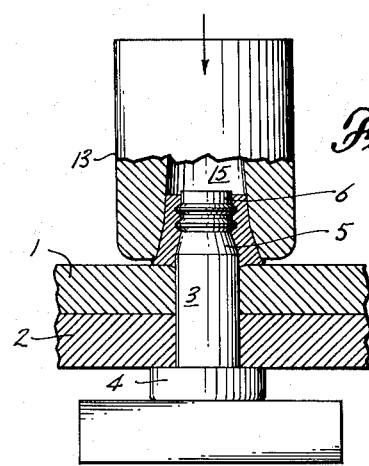

The ring 8 can be swaged in the manner described by movement of a collar constricting set 13 in a direction lengthwise of the lock bolt and axially of lock collar 8 toward the apertured member as indicated by the arrows in FIGURES 3 and 4. The cavity in such set is of a size to contact the outer portion of the ring 8, and such cavity is tapered toward its bottom so as to effect an annular wedging engagement with the outer portion of the ring. Such wedging action can be increased by forming the set cavity with a flared entrance portion 14, the walls of which are disposed at a greater angle to the axis of the cavity than the remaining portion 15 of the cavity. The shape of the set cavity 14, 15 and the shape of the outer portion of the ring 8 will be selected for interaction as the set is moved from the position of FIGURE 2 to the position of FIGURE 3 and then to the position of FIGURE 4, so that the set cavity will produce the desired constriction of the ring and axial movement of ring material to the proper extent and in the proper sequence to obtain the desired tension of the lock bolt, general compressive stress in the collar and concentrated sealing compressive stress in the material of the rib 10.

Also the size of the set cavity 14, 15 and the quantity and distribution of the malleable metal of the ring 8 will be such that when the setting operation is completed, as shown in FIGURE 5, the bore of the collar will have been swaged into intimate contact with the portion of the lock bolt shank projecting beyond the apertured member, and the exterior of the ring will have been fashioned into a shape complemental to and of a size to fill the cavity of the lock collar constricting set 13 as its end abuts the apertured plate 1 and its setting movement is thereby interrupted. When the lock collar set is withdrawn the lock collar will remain in the deformed position shown in FIGURE 5, so that the compressive stress concentration in the material 10' shown in FIGURE 6 of the rib 10 and surface portion of the plate 1 underlying it will be maintained for a sustained period of indefinite duration to retain the sealing action of the compressive stress annulation at the surface junction between the shank 3 of the lock bolt and the apertured member 1 through which the lock bolt projects.

The lock collar 8 shown in FIGURES 1 to 6, inclusive, has a sealing rib 10 at only one end. Consequently, it is necessary to place the lock collar on the end of the lock bolt shank in the manner shown in FIGURES 1 and 2 with the rib 10 projecting toward the head of the lock bolt and the plates 1 and 2 in order to take advantage of the sealing effect of the rib when the lock collar is set on the lock bolt end. If a workman is careless and places the lock collar on the end of the lock bolt with the sealing rib projecting away from the lock bolt head, the sealing effect of the rib would not be obtained. To eliminate this possibility and to facilitate applying the lock collars to the lock bolts because of the lack of necessity of selecting the proper end to be placed first over the lock bolt, a lock collar of the type shown in FIGURE 77 or of the type shown in FIGURE 11 can be used.

The lock collar 16 shown in FIGURES 7, 8 and 9 has a sealing rib 17 at each end of its bore 18 and projecting in continuation of such bore. The exterior periphery of the lock collar 16 is symmetrical about a central diametral plane transversely of the lock collar's axis in having an annular central depression 19 with annular ribs 20 at opposite sides of such depression. It will be evident that such a lock collar may be applied to the lock bolt either end first because of its symmetry about a central diametral plane transversely of its axis. The stock in the lock collar should, of course, be distributed so that when the lock collar is set on the lock bolt its bore will be swaged inwardly into intimate locking engagement with the ribs 7 projecting from the end 6 of the lock bolt as illustrated in FIGURE 10. The shape of the bore 15 of the set 13 will, of course, be designed with respect to the shape of the lock collar so that the proper setting operation will be accomplished as illustrated in FIGURE 10.

It is not necessary that a double-ended lock collar have an exterior periphery like that of the collar 16 shown in FIGURES 7 and 8. In FIGURES 11 and 12 the double-ended lock collar 21 has a sealing rib 17' at each end of its bore 18' which may be of the same shape and size as the sealing ribs 17 and the bore 18, respectively, of the lock collar shown in FIGURES 7 and 8. In this instance, however, the external periphery, instead of having a central depression and ribs or ridges at the ends of the lock collar, is shown as having a raised central portion 22 and the end portions of the periphery have chamfered corners 23. Again, it is only necessary for the exterior periphery to be of a shape and size to enable an effective setting operation, as shown in FIGURE 13, to be accomplished.

We claim as our invention:

1. A lock bolt joint comprising a plate having an aperture therethrough, a lock bolt having a shank extending through and fitting snugly in such plate aperture and having a portion projecting outward beyond the adjacent surface of said plate, a lock collar contiguously encircling said projecting portion of said lock bolt, and an annular portion of the surface of said plate beneath said lock collar being slightly depressed by an annular rib on the end of said lock collar next to said plate having been swaged into flattened shape against such surface portion of said plate, said lock collar, by its engagement with such projecting portion of said lock bolt, maintaining under sustained compressive stress the slightly depressed surface portion of said plate beneath said lock collar and the portion of the lock collar end engaged therewith, which compressive stress is concentrated in an annulation of a width radially of said lock collar less than the maximum radial thickness of said lock collar and is located nearer the inner periphery than the outer periphery of said lock collar, the compressive stress in the slightly depressed surface portion of said plate in such annulation being greater than in the remainder of the surface portion of said plate beneath said lock collar.

2. The lock bolt joint defined in claim 1, in which the portion of the lock bolt projecting outward beyond the adjacent surface of the plate has an annular lock rib spaced from such plate surface, and the lock collar is swaged into intimate contact with said rib locking the bolt and collar against relative movement lengthwise of the bolt.

3. The method of making a lock bolt joint which comprises fitting the shank of a lock bolt snugly through registering apertures in plates to be joined so that an end portion of such lock bolt shank projects beyond a surface of one of such plates, placing over such projecting lock bolt shank end portion a lock collar having projecting toward the plates from its end an annular rib of a radial width less than the maximum radial thickness of the lock collar, and applying a swaging force on the lock collar in the direction toward the plates which simultaneously deforms the lock collar by pressing its end rib into flattened shape against the adjacent plate surface and slightly depresses the portion of the plate surface engaged by such lock collar rib, thereby creating a compressive stress concentration annulation in such plate surface depressed portion and the portion of the lock collar end engaged therewith of a width radially of the lock collar less than the maximum radial thickness of the lock collar and located nearer the inner periphery than the outer periphery of the lock collar, the compressive stress thus created in the depressed surface portion of the plate being greater than in the remainder of the surface portion of the plate beneath the lock collar, and which swaging force application also simultaneously deforms the lock collar inwardly into contiguous engagement with the projecting lock bolt shank end portion, thereby holding the lock collar against movement away from the plates and thus sustaining the compressive stress concentration in such annulation.

References Cited in the file of this patent

UNITED STATES PATENTS

| | | |
|---|---|---|
| 490,067 | Connelly | Jan. 17, 1893 |
| 653,901 | Bray | July 17, 1900 |
| 771,236 | Farley | Oct. 4, 1904 |
| 1,137,433 | Swartwood | Apr. 27, 1915 |
| 2,395,667 | Keller | Feb. 26, 1946 |
| 2,397,076 | Keller | Mar. 19, 1946 |
| 2,520,259 | Pummill | Aug. 29, 1950 |
| 2,531,049 | Huck | Nov. 21, 1950 |
| 2,542,376 | Torresen | Feb. 20, 1951 |
| 2,754,703 | Huck | July 17, 1956 |
| 2,994,124 | Denny | Aug. 1, 1961 |